(No Model.) 2 Sheets—Sheet 2.
G. S. EATON.
CONDUIT FOR ELECTRICAL CONDUCTORS.
No. 266,681. Patented Oct. 31, 1882.
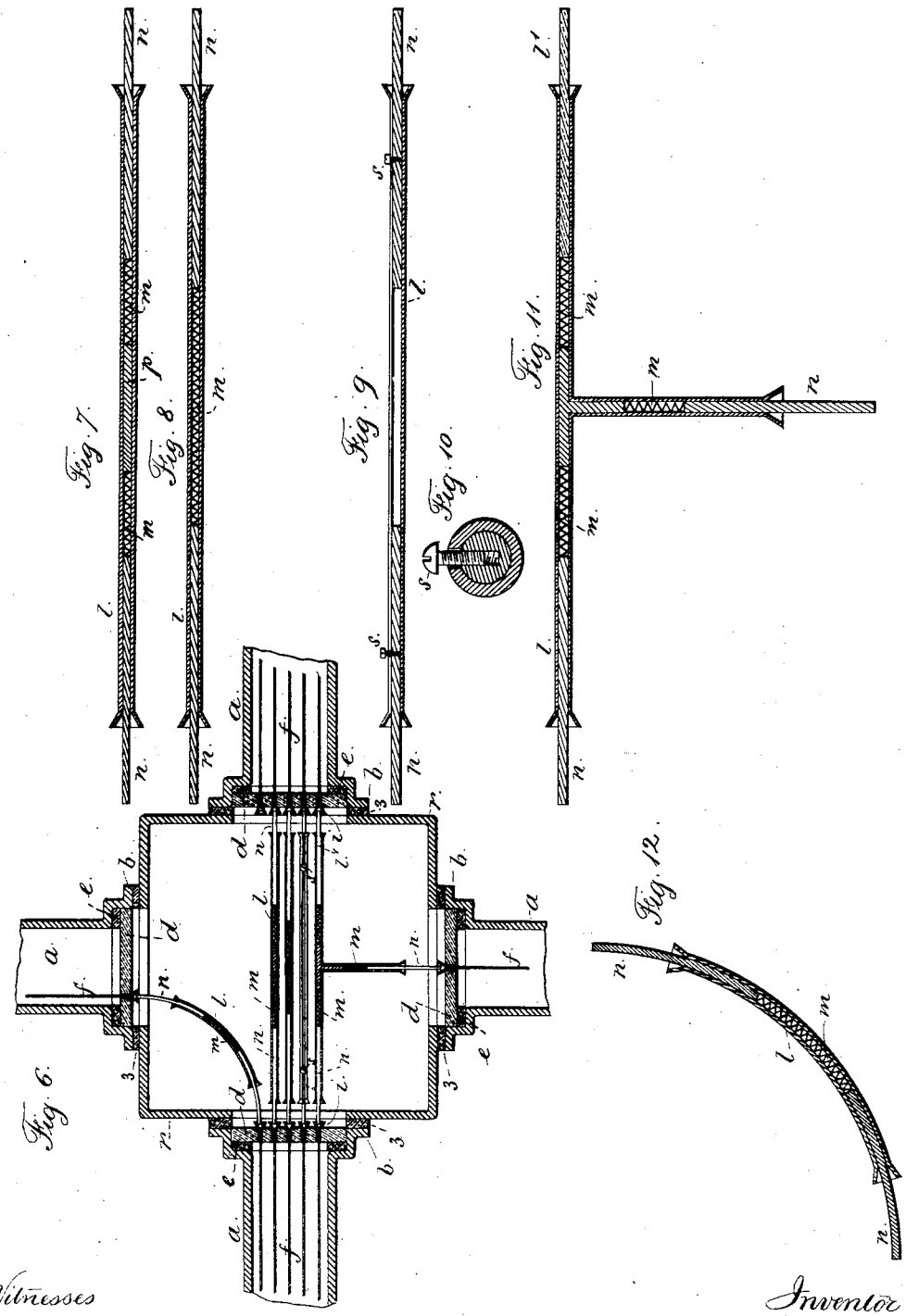
Witnesses
Chas H Smith
J. Hail
Inventor
George S. Eaton
per Lemuel W. Serrell atty

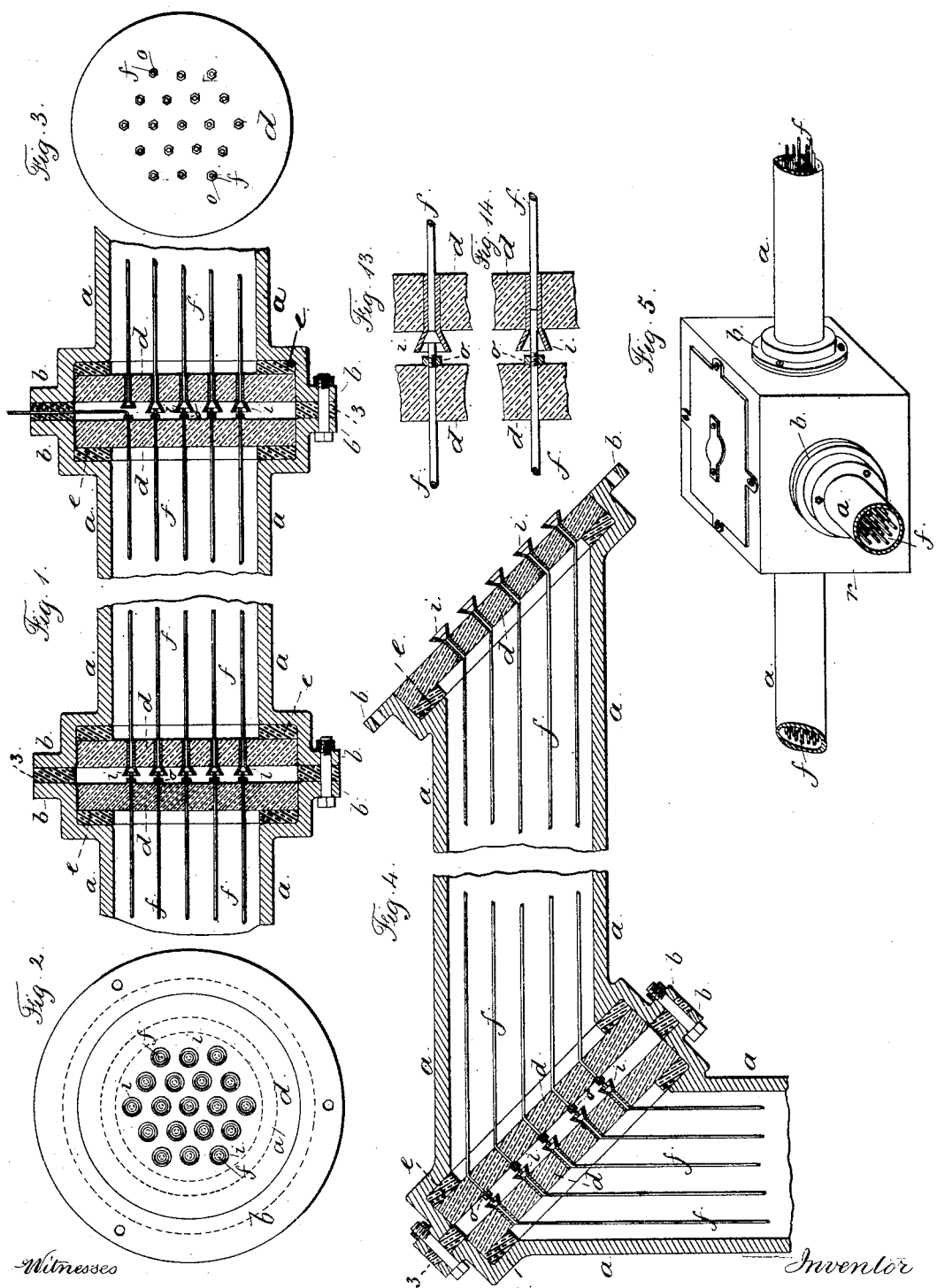

UNITED STATES PATENT OFFICE.

GEORGE S. EATON, OF BROOKLYN, NEW YORK.

CONDUIT FOR ELECTRICAL CONDUCTORS.

SPECIFICATION forming part of Letters Patent No. 266,681, dated October 31, 1882.

Application filed May 1, 1882. (No model.)

*To all whom it may concern:*

Be it known that I, GEORGE S. EATON, of Brooklyn, E. D., in the county of Kings and State of New York, have invented an Improvement in Conduits for Electrical Conductors, of which the following is a specification.

Telegraph and telephone conductors have been placed in metal tubes, such conductors being insulated and twisted together, and in some instances the conductors have been brought out through a head at the terminals of the tube.

I make use of wires drawn through non-conducting disks and secured to the same within metal tubes, so that each length of metal tube forms a complete section containing all the wires securely held in position, and in laying down such sections the wires make contact one with the other by simply screwing the sections together. By this means it becomes unnecessary to cover the wires with insulating material, as they can be stretched in the tube-sections without coming into contact; but, if desired, insulating-coverings may be applied to the conductors.

In the drawings, Figure 1 is a section showing the ends of metal tubes where they are joined together and the insulating-disks. Fig. 2 represents the face of the disk at one end of a section, and Fig. 3 is the face of the disk at the other end of a section. Fig. 4 is a section showing the parts at a right-angle bend in the sections. Fig. 5 is a perspective view of a proof-box and branch. Fig. 6 is a sectional plan of the same in larger size, and Figs. 7 to 12 represent in larger sizes the coupling-connections of the wires at the said proof and branch box. Figs. 13 and 14 represent sectional views, in larger size, of the coupling.

The pipes $a$ $a$ are preferably of cast-iron. There are flanges $b$ $b$ at the ends, by which they are to be bolted together when laid down into the trench in the earth, or when connected in buildings or other places wherever employed. There are annular seats at the ends of the pipes for the reception of the perforated non-conducting disks $d$, which disks have as many holes in them as there are wires to be introduced into the tube. Between each disk $d$ and the annular seat there is to be one or more rings or washers, $e$, of india-rubber, felt, or other elastic material, to form a support for the edges of the disk $d$. The wires $f$ are stretched in each tube from one disk $d$ to the other, such wires being drawn through the corresponding holes in the disks, so as to be parallel to each other, and stretched so as not to sag and touch each other. It is to be understood that each length of iron tubing is to be prepared complete by stretching the wires in it before it is laid, and this is distinguished from cases where the iron pipes are laid and the wires drawn through the same, because in my present invention the wires are united to each other at each joint in the pipe, as hereinafter set forth, instead of extending as far as possible in the pipes, and being connected at proof-boxes or branch tubes only, as heretofore. At the ends of the pipes the flanges are to be bolted together, and the disks and their holes occupy uniform relative positions to the bolt-holes, so that the wires come in line with each other when the ends of the pipes are brought together. I employ an automatic coupling between the ends of each line of wires. Such automatic coupling is to be of any suitable character; but I prefer to employ at one end of each wire a tube, $i$, with a flaring mouth, into which is received the end of the corresponding wire in the next tube. If each tubular coupling $i$ is soldered to its wire and drawn into its appropriate opening in the disk $d$, and the end of the other corresponding wire in the next section, where it projects outside the opposite disk, is left sufficiently long, the wires in one section will slip into and form metallic connections with the corresponding tubular couplings of the next section by the simple act of placing the sections end to end and bolting them together. It is usually preferable to employ a nut, $o$, on each wire to produce the required tension, the wire having a screw-thread cut upon it near the end.

If desired, the contact between the ends of the corresponding wires can be by means of helical springs, or by a second nut on each wire coming into contact with the bell-mouth $i$ of the next wire.

At the places where the tubes $a$ are bolted together it is preferable to employ one or more rubber or felt washers, 3, to make the parts tight, but to allow of the required elasticity, and at these places single conducting-wires can be taken off as branches, as shown in Fig. 1, the wire being between and embedded in the flexible washers. At places where the pipes are laid at right angles the ends of the tubes $a$ will be made at an angle of about forty-five degrees, as shown in Fig. 4, the parts otherwise being the same.

Where proving-boxes $r$ are required I place the same between one section of pipe $a$ and the next, as seen in Figs. 5 and 6, and I introduce movable couplings, such as shown in Figs. 7 to 12.

Each movable coupling is adapted to be disconnected from the respective wires, and for this purpose I prefer to employ small metal tubes $l$, in each of which is a spring, $m$, and a rod, $n$, or there may be two rods, one at each end, with the spring between them, as seen in Fig. 8; or there may be two springs with an intermediate abutment at $p$, Fig. 7. By pushing in the rods the coupling can be either applied between the ends of the fixed conductors or removed therefrom.

In some instances, where the current is to be interrupted, a glass rod, $l'$, may be inserted in place of the metal rod, and where a branch conductor is to be taken off the coupling will be made T-shaped, as seen in Figs. 6 and 11, so as to connect with the appropriate wire in the branch, or else the coupling will be in the form of an arc of a circle, as seen in Figs. 6 and 12, with the rods sliding in the tubular arc and projected by one or two springs, as aforesaid, so that the arc-coupling may be placed between the main and branch wires, as shown in Fig. 6.

If slotted tubes are used for the couplings, the springs may be dispensed with by employing clamping-screws $s$ to clamp the rods to the pipes after the couplings have been put in place, as shown in Figs. 9 and 10. I prefer to have the air exhausted from the tubes after they are laid in place, so as to remove any moisture and promote perfect insulation.

I claim as my invention—

1. The combination, with the tubes $a$, having connecting-flanges $b$, of the disks $d$, elastic washers $e$, and wires $f$, passing through the disks, each wire being provided with a head or tube, $i$, at one end, and a nut, $o$, at the other end, substantially as set forth.

2. The combination, with the tubes $a$ and connecting-flanges in one piece, of the disks $d$, elastic washers $e$, wires $f$ within the tubes and passing through said disks, the movable coupling-tubes $l$, having sliding rods $n$ within them, and means for fastening the tubes $l$ to the circuit-wires, substantially as set forth.

3. The tubes $a$, having flanges at their ends, in combination with the disks $d$, wires $f$, passing through the disks, and devices, as described, for holding the wires taut within the tubes, the means for connecting the wires at their ends, as set forth, elastic washers between the flanges, and bolts for holding and uniting the same, whereby the tubes are closed air-tight, substantially as specified.

Signed by me this 25th day of April, A. D. 1882.

GEO. S. EATON.

Witnesses:
GEO. T. PINCKNEY,
WILLIAM G. MOTT.